US009615008B2

(12) United States Patent
Sun

(10) Patent No.: US 9,615,008 B2
(45) Date of Patent: Apr. 4, 2017

(54) IMAGING LENS AND IMAGING APPARATUS EQUIPPED WITH THE SAME

(71) Applicant: FUJIFILM Corporation, Tokyo (JP)

(72) Inventor: Ping Sun, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 102 days.

(21) Appl. No.: 14/732,908

(22) Filed: Jun. 8, 2015

(65) Prior Publication Data

US 2015/0271374 A1 Sep. 24, 2015

Related U.S. Application Data

(63) Continuation of application No. PCT/JP2013/007228, filed on Dec. 9, 2013.

(30) Foreign Application Priority Data

Dec. 26, 2012 (JP) .................................. 2012-281968

(51) Int. Cl.
*G02B 9/00* (2006.01)
*H04N 5/225* (2006.01)
*G02B 13/04* (2006.01)
*G02B 13/18* (2006.01)

(52) U.S. Cl.
CPC ........... *H04N 5/2254* (2013.01); *G02B 13/04* (2013.01); *G02B 13/18* (2013.01)

(58) Field of Classification Search
CPC  G02B 13/0045; G02B 15/177; G02B 15/173; G02B 9/64; G02B 7/021
USPC ................................................ 359/642–830
See application file for complete search history.

(56) References Cited

U.S. PATENT DOCUMENTS

| | | | |
|---|---|---|---|
| 5,625,497 | A | 4/1997 | Emomoto |
| 5,644,435 | A | 7/1997 | Shikama |
| 6,191,896 | B1 | 2/2001 | Itoh |
| 2007/0206294 | A1 | 9/2007 | Kanai |
| 2010/0027136 | A1 | 2/2010 | Ohashi et al. |

FOREIGN PATENT DOCUMENTS

| | | |
|---|---|---|
| JP | 43-13833 | 6/1968 |
| JP | 08-194159 | 7/1996 |
| JP | 11-167063 | 6/1999 |
| JP | 11-326756 | 11/1999 |
| JP | 3392964 | 3/2003 |
| JP | 2007-233045 | 9/2007 |
| JP | 2008-151949 | 7/2008 |
| JP | 2010-039088 | 2/2010 |

OTHER PUBLICATIONS

International Search Report PCT/JP2013/007228 dated Apr. 8, 2014.

*Primary Examiner* — Mahidere Sahle
(74) *Attorney, Agent, or Firm* — Young & Thompson

(57) ABSTRACT

An imaging lens consists of a front group having a positive refractive power, a stop, and a rear group having a positive refractive power. The front group is composed of a front group negative lens group constituted by two or more negative lenses and a front group positive lens group constituted by a plurality of lenses with a positive lens being disposed on the most object side to have a positive refractive power, in order from the object side. The rear group includes at least one negative lens. When the Abbe number of the most object side positive lens in the front group positive lens group with respect to the d-line is taken as νp, the imaging lens satisfies a conditional expression (1): νp<30.

18 Claims, 10 Drawing Sheets

EXAMPLE 1

FIG.3 EXAMPLE 2
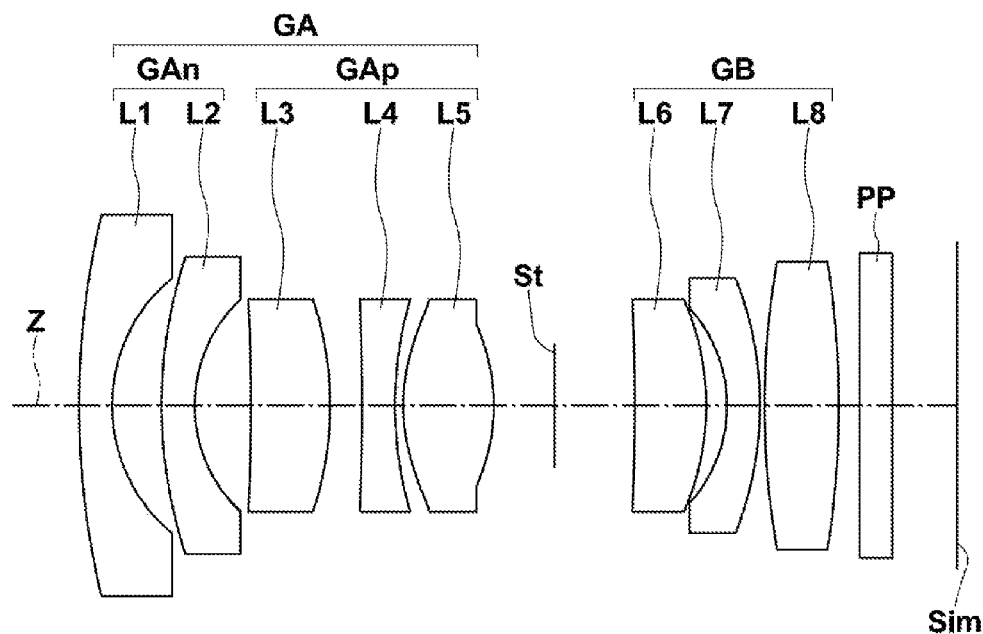
FIG.4 EXAMPLE 3
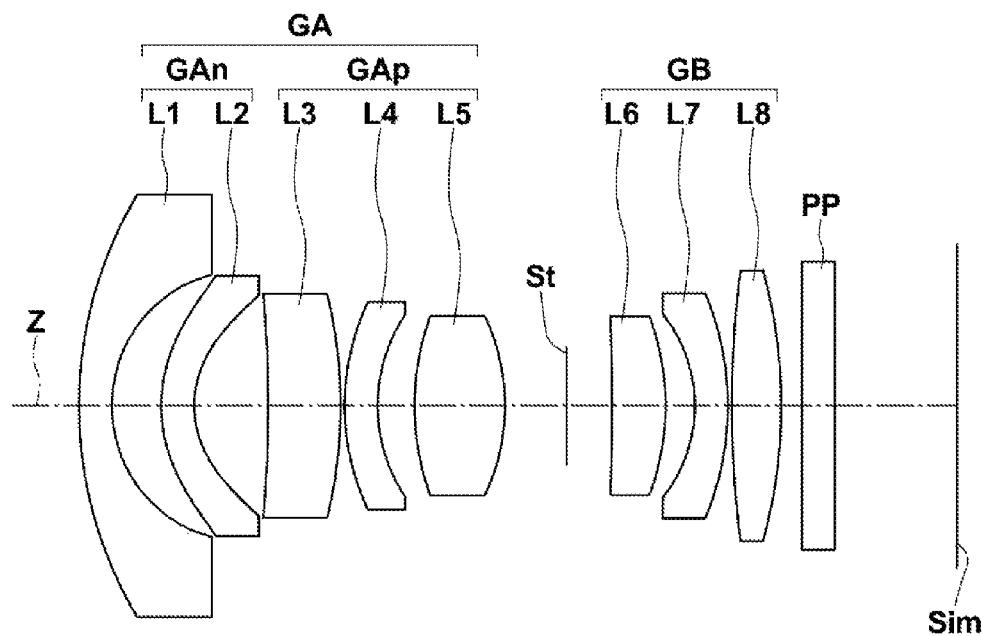

FIG.5  EXAMPLE 4
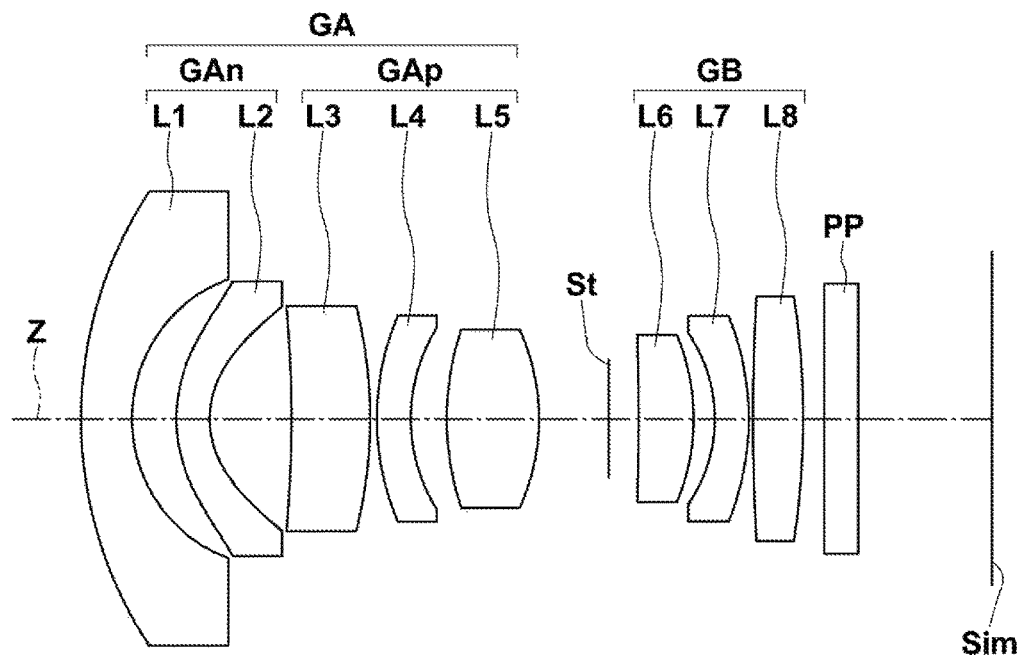
FIG.6  EXAMPLE 5
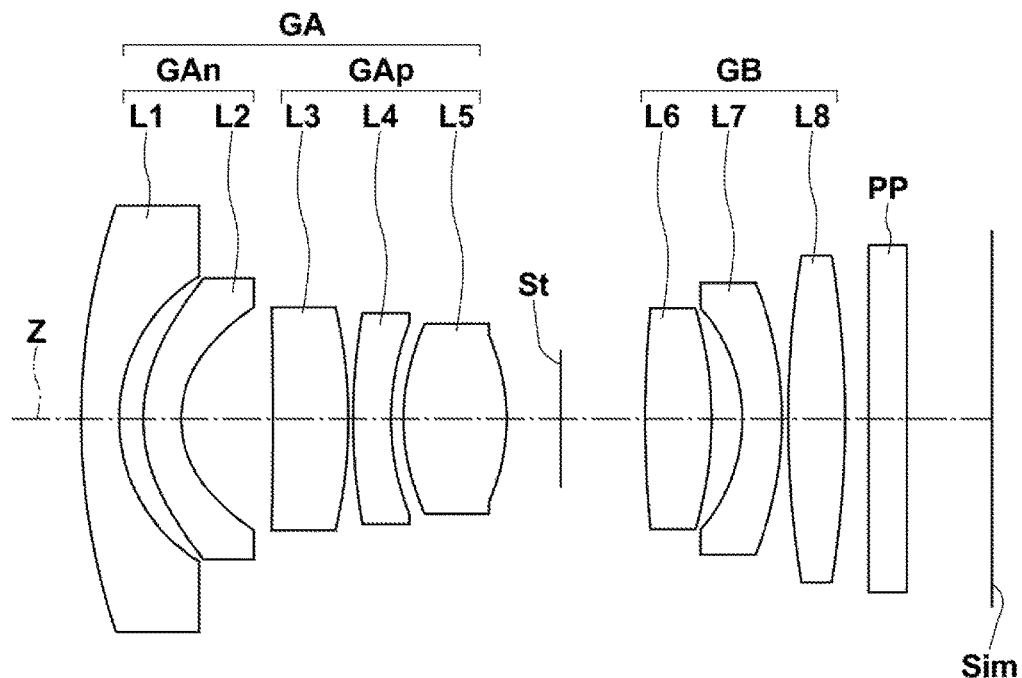

FIG.7    EXAMPLE 6
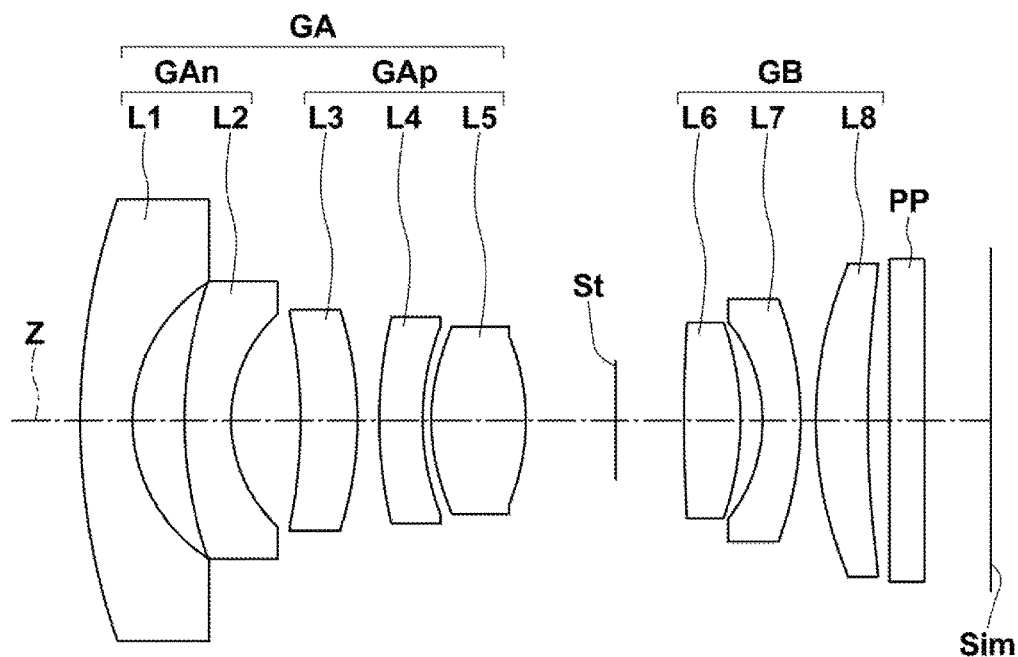
FIG.8    EXAMPLE 7
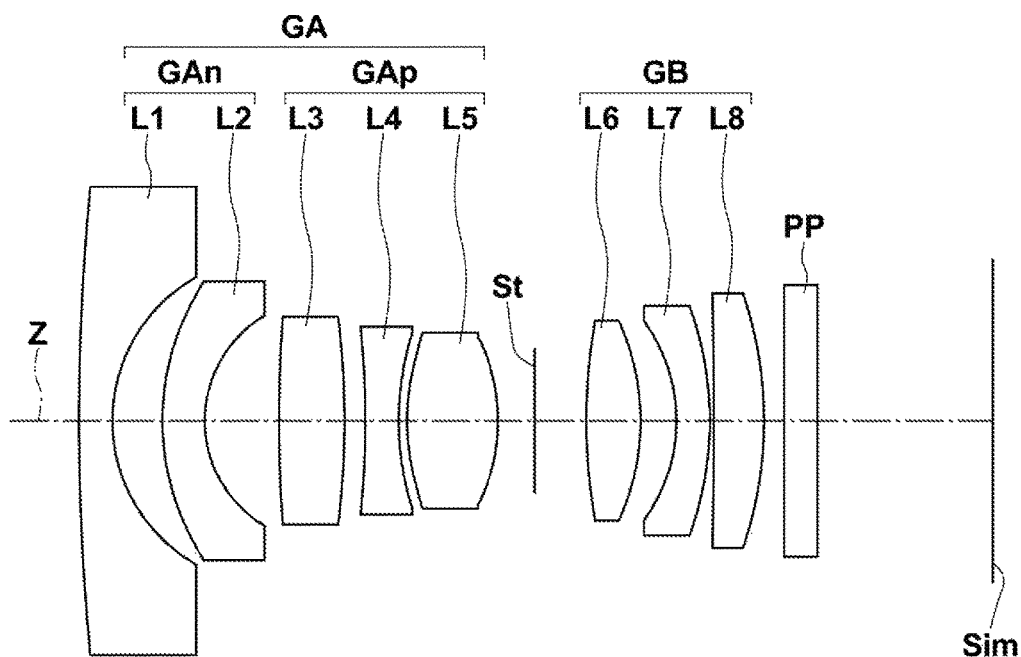

FIG.9  EXAMPLE 8
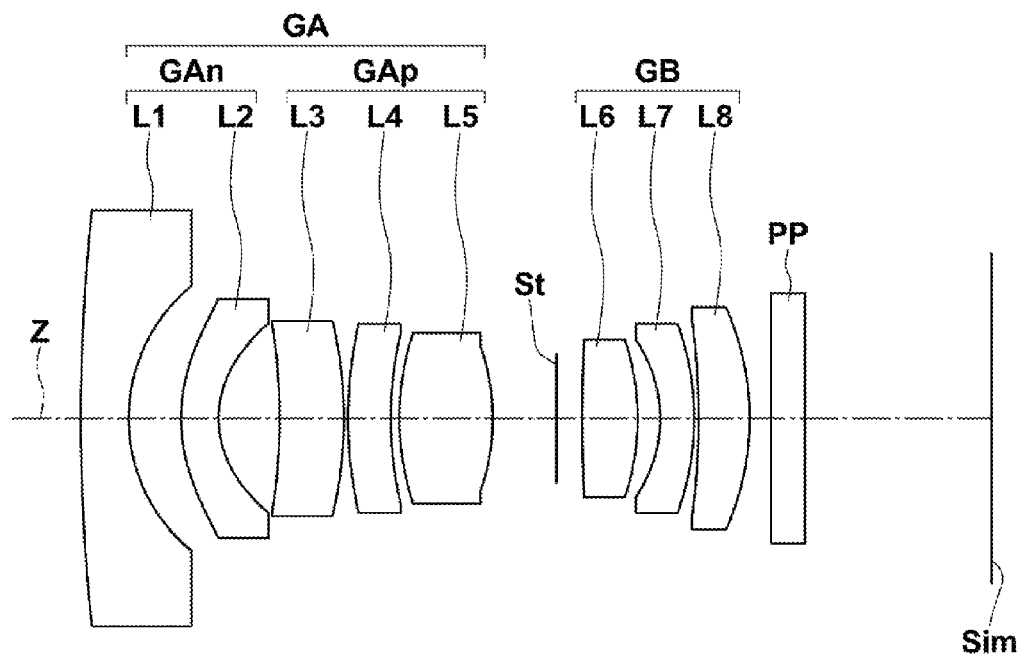
FIG.10  EXAMPLE 9
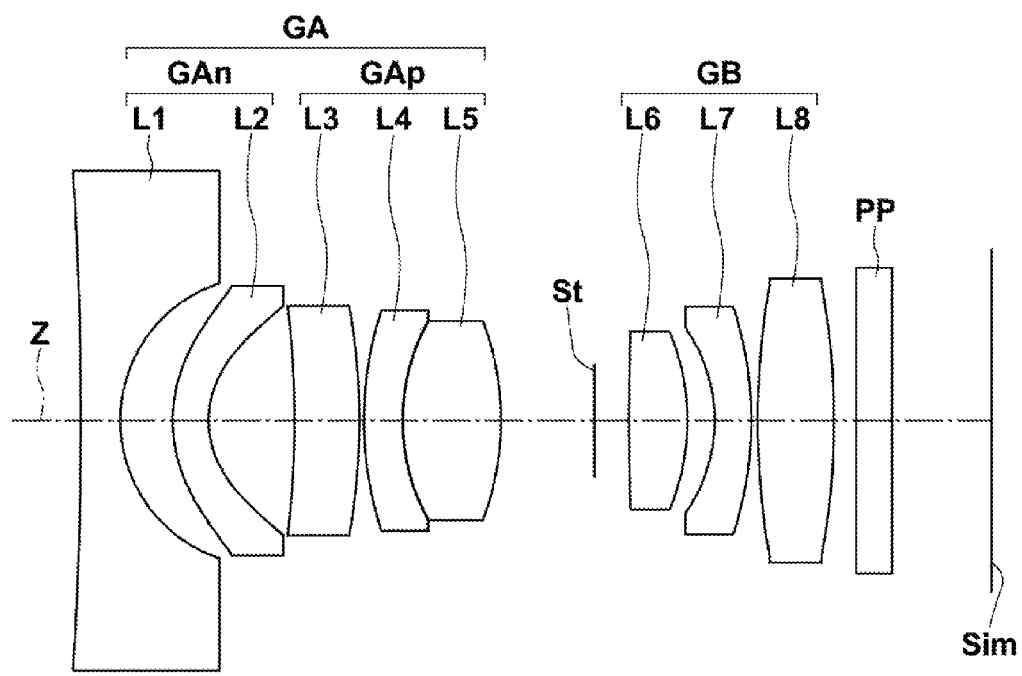

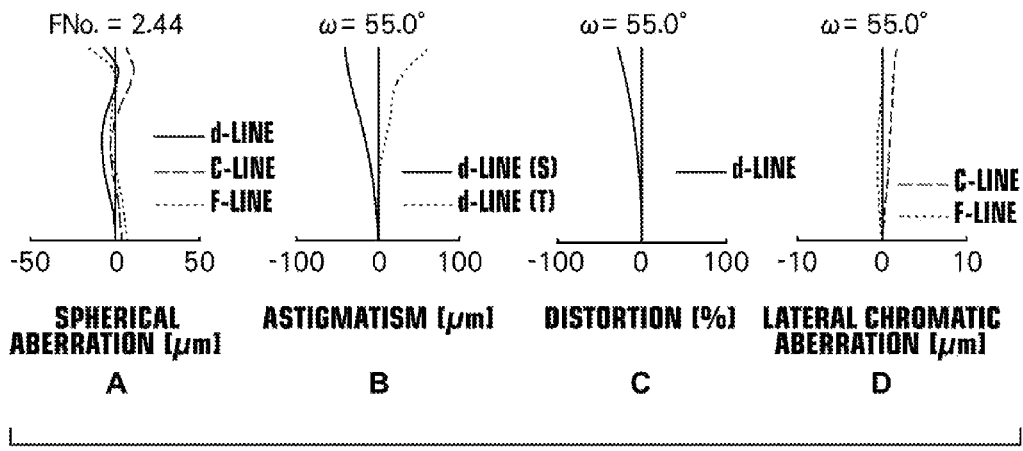
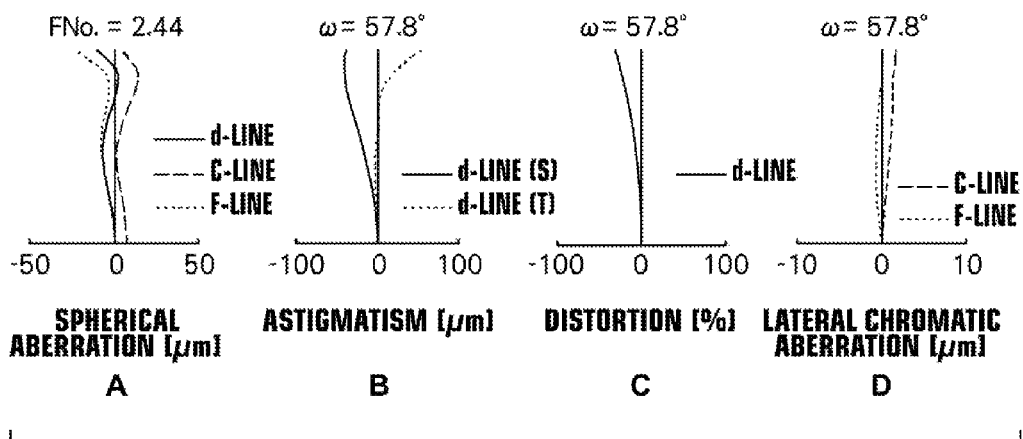

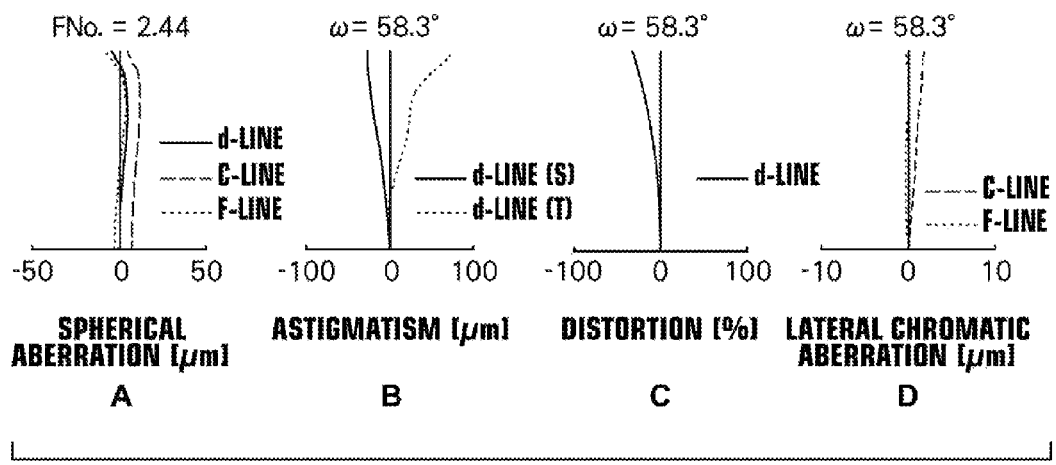
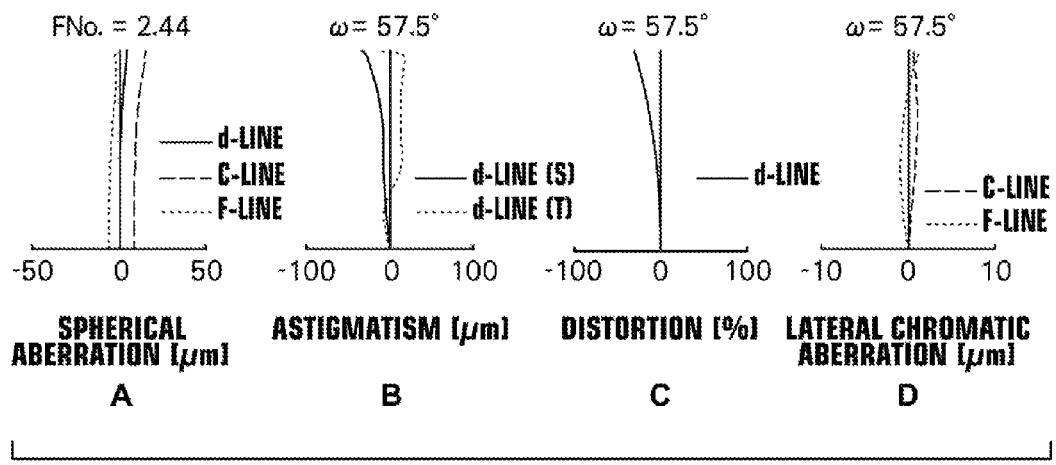

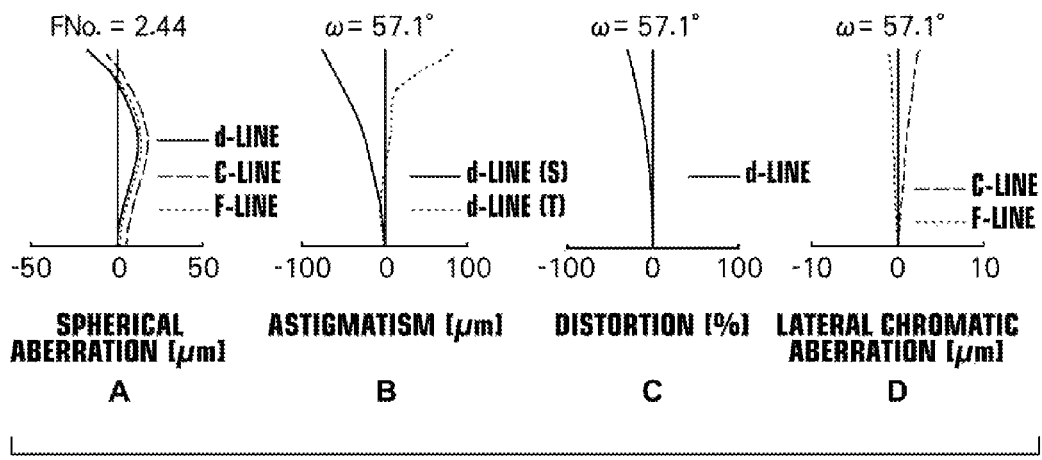
FIG.15  EXAMPLE 5
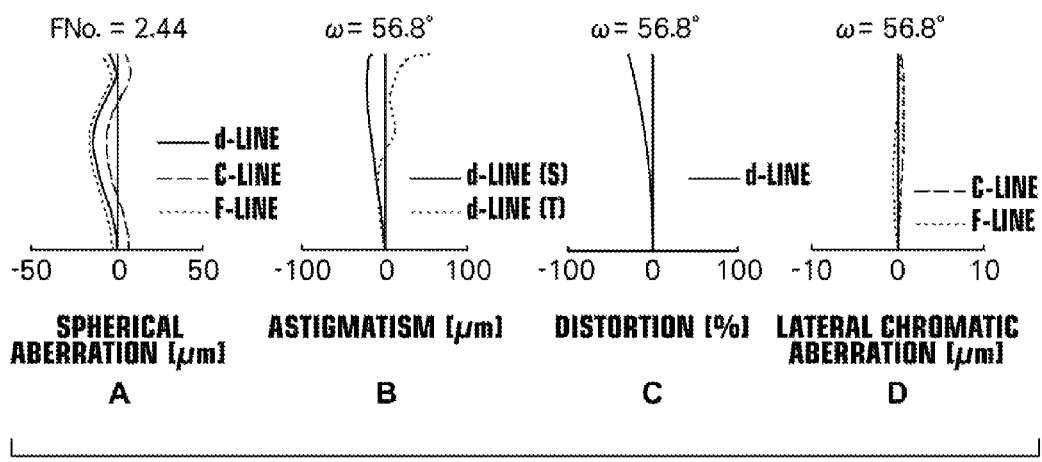
FIG.16  EXAMPLE 6

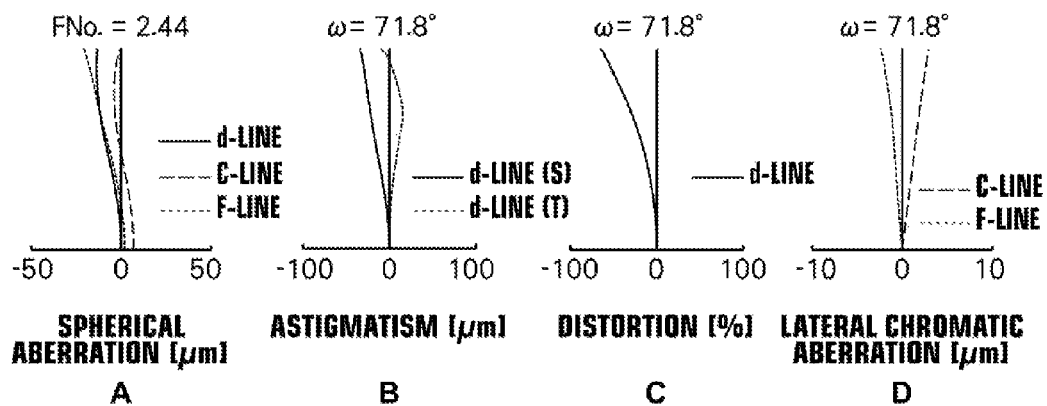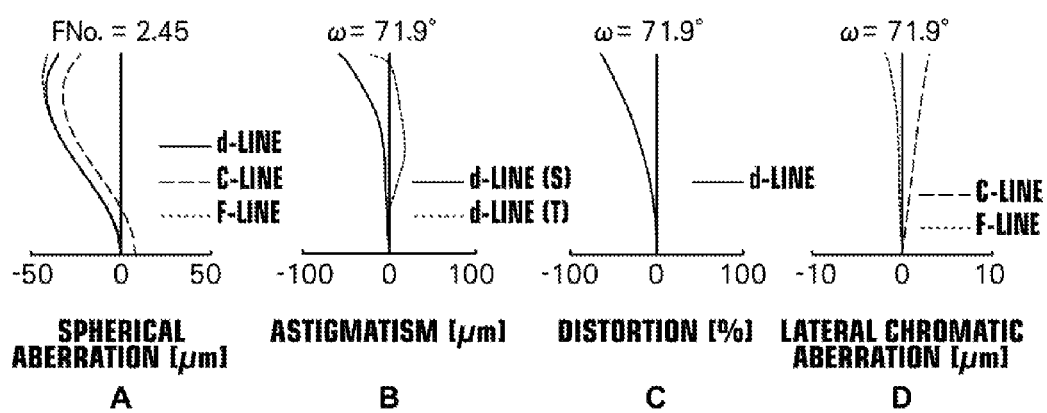

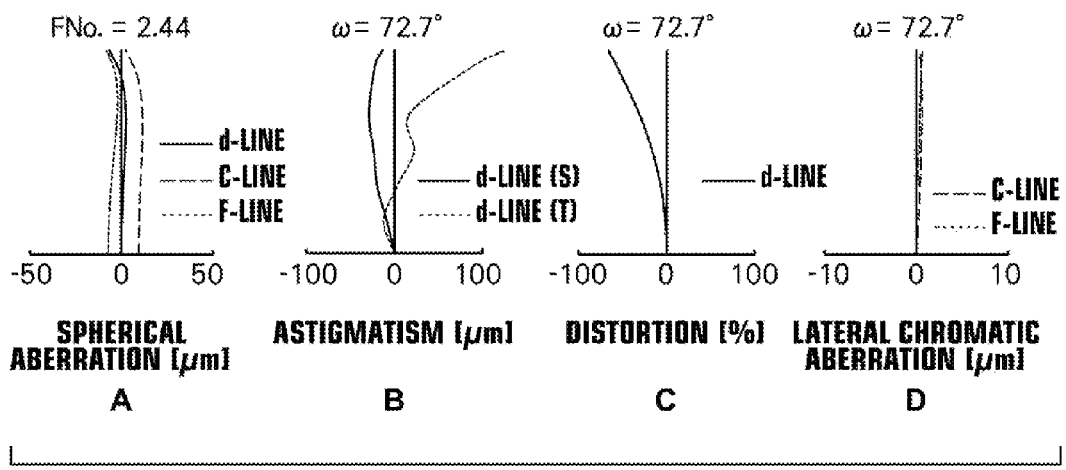
FIG.19 EXAMPLE 9
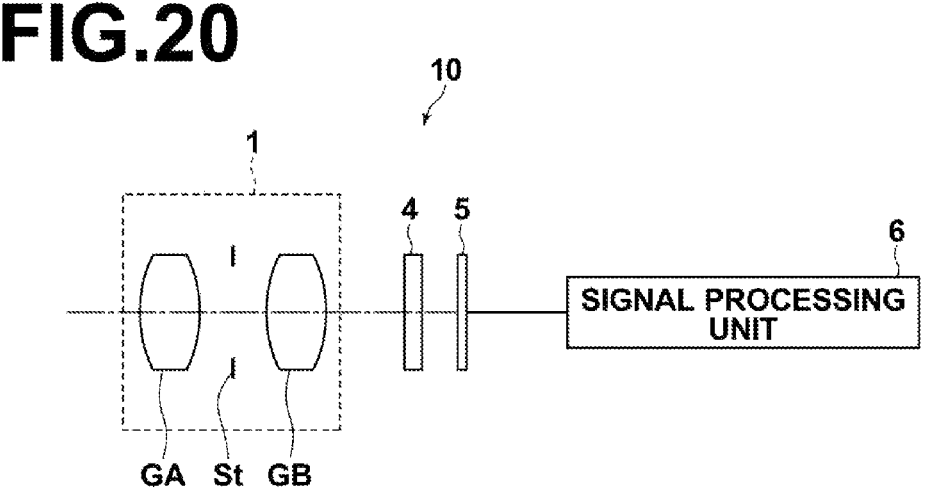
FIG.20

IMAGING LENS AND IMAGING APPARATUS EQUIPPED WITH THE SAME

CROSS-REFERENCE TO RELATED APPLICATIONS

This application is a Continuation of PCT International Application No. PCT/JP2013/007228 filed on Dec. 9, 2013, which claims priority under 35 U.S.C. §119 (a) to Japanese Patent Application No. 2012-281968 filed on Dec. 26, 2012. Each of the above applications is hereby expressly incorporated by reference, in its entirety, into the present application.

BACKGROUND OF THE INVENTION

Technical Field

The present invention relates to an imaging lens and an imaging apparatus equipped with the same, and more specifically to an imaging lens which can be used suitably in digital cameras, broadcasting cameras, surveillance cameras, vehicle cameras, and the like, and an imaging apparatus equipped with the imaging lens.

Background Art

Lens systems in which a front group having a positive refractive power is disposed on the object side of a stop and a rear group having a positive refractive power is disposed on the image side of the stop have been known, and such lens systems may include those described, for example, in Japanese Patent No. 3392964, Japanese Unexamined Patent Publication No. 2008-151949, and Japanese Unexamined Patent Publication No. 2010-039088. The front group of the lens system described in Japanese Patent No. 3392964, Japanese Unexamined Patent Publication No. 2008-151949, and Japanese Unexamined Patent Publication No. 2010-039088 is configured to be composed of a negative lens group which includes at least two negative lenses and a positive lens group which includes at least one positive lens.

SUMMARY OF INVENTION

In the meantime, downsizing and higher pixel counts of solid-state image sensors installed on the cameras used in the aforementioned fields have been in progress and, along with this, imaging lenses are also demanded to be small, in particular, a reduced length of the overall lens system, and to have high performance with well corrected aberrations. On the other hand, imaging lenses used in surveillance cameras and vehicle cameras are demanded to have a small F-number and a wide angle of view.

The lens system described in Japanese Patent No. 3392964, however, is insufficiently corrected in spherical aberration, longitudinal chromatic aberration, and the like. The lens system described in Japanese Unexamined Patent Publication No. 2008-151949 has a large F-number of 3.6. The lens system described in Japanese Unexamined Patent Publication No. 2010-039088 has an insufficient angle of view of about 78° in total angle of view.

The present invention has been developed in view of such problems, and it is an object of the present invention to provide an imaging lens having a short overall length, a small F-number, a wide angle, and high optical performance with well corrected aberrations, and an imaging apparatus equipped with the imaging lens.

An imaging lens of the present invention consists essentially of a front group having a positive refractive power, a stop, and a rear group having a positive refractive power, in order from the object side, in which the front group is composed of a front group negative lens group constituted by two or more negative lenses and a front group positive lens group constituted by a plurality of lenses with a positive lens being disposed on the most object side to have a positive refractive power, in order from the object side, the rear group includes at least one negative lens, and when the Abbe number of the most object side positive lens in the front group positive lens group with respect to the d-line is taken as νp, the imaging lens satisfies a conditional expression (1) given below:

$$\nu p < 30 \tag{1}.$$

The imaging lens of the present invention preferably satisfies a conditional expression (1') given below and more preferably satisfies a conditional expression (1") given below, instead of the foregoing conditional expression (1):

$$\nu p < 25 \tag{1'},$$

$$\nu p < 23 \tag{1"}.$$

Further, when the Abbe number of a negative lens with respect to the d-line, which is the smallest of those of negative lenses included in the rear group with respect to the d-line, is taken as νn, the imaging lens of the present invention preferably satisfies a conditional expression (2) given below and more preferably satisfies a conditional expression (2') given below:

$$\nu n < 23 \tag{2},$$

$$\nu n < 20 \tag{2'}.$$

Still further, when the focal length of the entire system is taken as f and the focal length of the front group is taken as fA, the imaging lens of the present invention preferably satisfies a conditional expression (3) given below and more preferably satisfies a conditional expression (3') given below:

$$0.3 < f/fA < 1.2 \tag{3},$$

$$0.4 < f/fA < 1.0 \tag{3'}.$$

Further, when the focal length of the front group is taken as fA and the focal length of the rear group is taken as fB, the imaging lens of the present invention preferably satisfies a conditional expression (4) given below and more preferably satisfies a conditional expression (4') given below:

$$0.1 < fA/fB < 1.2 \tag{4},$$

$$0.2 < fA/fB < 1.0 \tag{4'}.$$

Still further, when the radii of curvature of the object side surface and the image side surface of the most object side positive lens in the front group positive lens group are taken as Rp1 and Rp2 respectively, the imaging lens of the present invention preferably satisfies a conditional expression (5) given below and more preferably satisfies a conditional expression (5') given below:

$$0.1 < (Rp1 - Rp2)/(Rp1 + Rp2) < 4.5 \tag{5},$$

$$0.15 < (Rp1 - Rp2)/(Rp1 + Rp2) < 4.1 \tag{5'}.$$

Further, when the air space between the front group negative lens group and the front group positive lens group on the optical axis is taken as Dnp, and the focal length of the entire system is taken as f, the imaging lens of the present invention preferably satisfies a conditional expression (6) given below and more preferably satisfies a conditional expression (6') given below:

$$0.1 < Dnp/f < 0.8 \qquad (6),$$

$$0.2 < Dnp/f < 0.6 \qquad (6').$$

In the imaging lens of the present invention, the front group positive lens group is preferably composed of a positive lens, a negative lens, and a positive lens, in order from the object side.

In the imaging lens of the present invention, it is preferable that the front group negative lens group is composed of two negative lenses, the front group positive lens group is composed of a positive lens, a negative lens, and a positive lens, in order from the object side, and the rear group is composed of a positive lens, a negative lens, and a positive lens, in order from the object side.

In the imaging lens of the present invention, at least one of the most image side lens in the front group negative lens group, the most image side lens in the front group positive lens group, and the most image side lens in the rear group is preferably an aspherical lens.

The foregoing "essentially" in the context of "consists essentially of" intends that the zoom lens may include a lens having substantially no refractive power, an optical element other than a lens, such as a stop, a cover glass, a filter, and the like, a lens flange, a lens barrel, an image sensor, and a mechanical component, such as a camera shake correction mechanism, in addition to the constituent elements described above.

The lens surface shape, sign of refractive power, and radius of curvature in the imaging lens of the present invention described above are considered in the paraxial region if an aspherical surface is included. The sign of radius of curvature is positive if the surface shape is convex on the object side and negative if it is convex on the image side.

An imaging apparatus of the present invention is equipped with the imaging lens of the present invention.

According to the present invention, in a lens system in which a negative lens group, a positive lens group, a stop, and a positive rear group are disposed in order from the object side, each lens group is configured appropriately, in particular, the most object side positive lens in the positive lens group is configured to satisfy the conditional expression (1) with respect to the Abbe number of the lens. This allows an imaging lens having a short overall length, a small F-number, a wide angle, and high optical performance with well corrected aberrations to be provided, as well as an imaging apparatus equipped with such imaging lens.

BRIEF DESCRIPTION OF THE DRAWINGS

FIG. 3 is a cross-sectional view of an imaging lens of Example 2, illustrating the configuration thereof.

FIG. 4 is a cross-sectional view of an imaging lens of Example 3, illustrating the configuration thereof.

FIG. 5 is a cross-sectional view of an imaging lens of Example 4, illustrating the configuration thereof.

FIG. 6 is a cross-sectional view of an imaging lens of Example 5, illustrating the configuration thereof.

FIG. 7 is a cross-sectional view of an imaging lens of Example 6, illustrating the configuration thereof.

FIG. 8 is a cross-sectional view of an imaging lens of Example 7, illustrating the configuration thereof.

FIG. 9 is a cross-sectional view of an imaging lens of Example 8, illustrating the configuration thereof.

FIG. 10 is a cross-sectional view of an imaging lens of Example 9, illustrating the configuration thereof.

A to D of FIG. 11 show each aberration diagram of the imaging lens of Example 1 of the present invention.

A to D of FIG. 12 show each aberration diagram of the imaging lens of Example 2 of the present invention.

A to D of FIG. 13 show each aberration diagram of the imaging lens of Example 3 of the present invention.

A to D of FIG. 14 show each aberration diagram of the imaging lens of Example 4 of the present invention.

A to D of FIG. 15 show each aberration diagram of the imaging lens of Example 5 of the present invention.

A to D of FIG. 16 show each aberration diagram of the imaging lens of Example 6 of the present invention.

A to D of FIG. 17 show each aberration diagram of the imaging lens of Example 7 of the present invention.

A to D of FIG. 18 show each aberration diagram of the imaging lens of Example 8 of the present invention.

A to D of FIG. 19 show each aberration diagram of the imaging lens of Example 9 of the present invention.

FIG. 20 is a schematic configuration diagram of an imaging apparatus according to an embodiment of the present invention.

DESCRIPTION OF EMBODIMENTS

Figure 1:
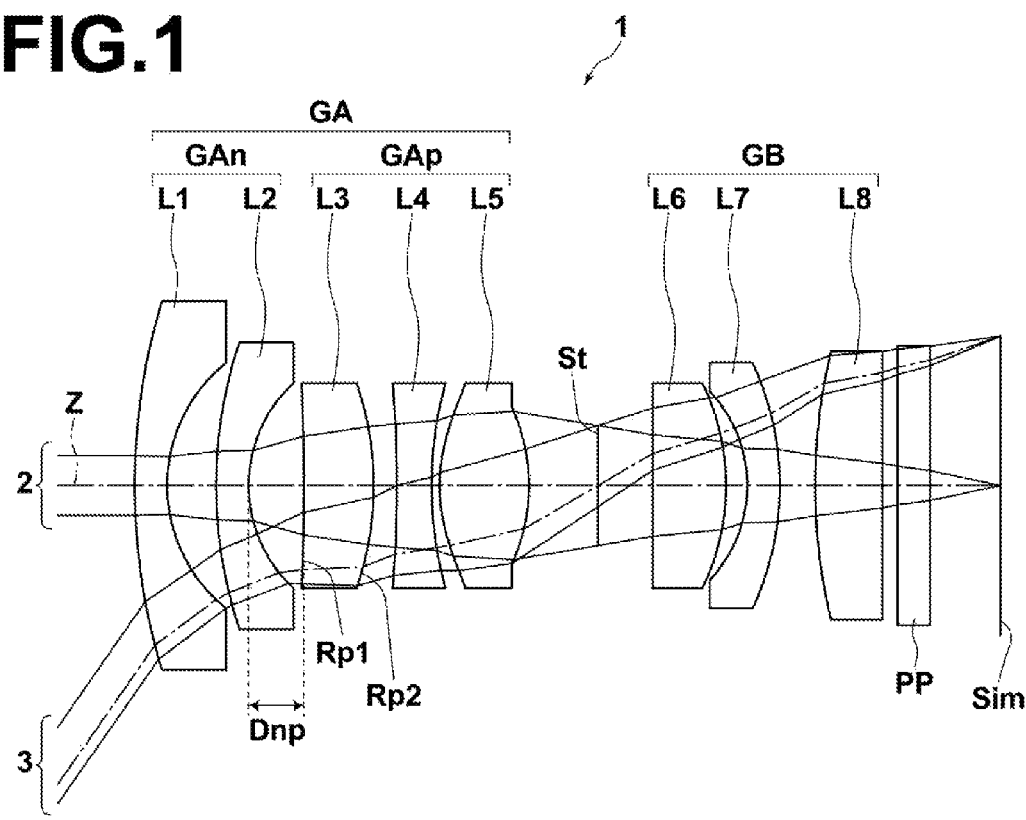
FIG. 1 is a cross-sectional view of an imaging lens according to an embodiment of the present invention, illustrating the configuration and optical paths thereof.

Hereinafter, embodiments of the present invention will be described in detail with reference to the accompanying drawings. FIG. 1 is a cross-sectional view of a zoom lens according to an embodiment of the present invention, illustrating the configuration thereof. The example shown in FIG. 1 corresponds to Example 1, to be described later. In FIG. 1 the left side is the object side and the right side is the image side. FIG. 1 also illustrates an axial light beam 2 and a maximum angle of view off-axis light beam 3.

An imaging lens 1 according to an embodiment of the present invention is a fixed focus optical system, consisting essentially of a front group GA having a positive refractive power as a whole, an aperture stop St, and a rear group GB having a positive refractive power as a whole, in order from the object side along the optical axis Z. Note that the aperture stop St shown in FIG. 1 does not necessarily represent the size or shape, but indicates the position on the optical axis Z.

When the imaging lens is mounted on an imaging apparatus, it is conceivable that the imaging apparatus is configured to include, as appropriate, a cover glass for protecting the image sensor, various types of filters, including a low-pass filter, an infrared-cut filter, according to the specifications of the imaging lens. Therefore, FIG. 1 illustrates an example in which a parallel-plate like optical member PP which assumes these is disposed between the most image side lens surface and the image plane Sim. Note that, however, the optical member PP is not an essential element of the imaging lens of the present invention.

The front group GA of the present embodiment is composed of a front group negative lens group GAn constituted by two or more negative lenses and a front group positive lens group GAp constituted by a plurality of lenses with a positive lens being disposed on the most object side to have a positive refractive power, in order from the object side, and the rear group GB is configured to include at least one negative lens.

For example, in the example shown in FIG. 1, the front group negative lens group GAn is composed of a negative lens L1 and a negative lens L2, in order from the object side, the front group positive lens group GAp is composed of a positive lens L3, a negative lens L4, and a positive lens L5, in order from the object side, while the rear group GB is composed of a positive lens L6, a negative lens L7, and a positive lens L8, in order from the object side, whereby the entire system of the imaging lens 1 is composed of eight lenses.

Use of positive lens groups for both the front group GA and the rear group GB which are lens groups on the object side and image side of the aperture stop St respectively allows the overall length of the lens system to be reduced. The negative leading power arrangement in which the lens group having a negative refractive power is disposed on the most object side followed by the lens group having a positive refractive power is advantageous for increasing the angle of view. That is, the employment of the configuration in which the front group negative lens group GAn, the front group positive lens group GAp, the aperture stop St, and the rear group GB having a positive refractive power are disposed in order from the object side allows reduction in overall length, while maintaining a wide angle of view.

In comparison with a retrofocus configuration in which a negative lens group, an aperture stop, and a positive lens group are disposed in order from the object side, the configuration in which a negative lens group, a positive lens group, an aperture stop, and a positive lens group are disposed allows spherical aberration which should be corrected by the lens group on the image side of the aperture stop to be reduced, thereby facilitating the realization of a small F-number.

The inclusion of two or more negative lenses in the front group negative lens group GAn allows the negative power of the front group negative lens group GAn to be shared by a plurality of lenses, thereby facilitating the suppression of aberrations generated when the angle of view is increased. Further, the inclusion of at least one negative lens in the rear group GB having a positive refractive power may facilitate well-balanced aberration correction on the image side of the aperture stop St, whereby satisfactory optical performance may be realized.

The front group negative lens group GAn may be configured to be composed of two negative lenses, and if that is the case, aberrations generated when the angle of view is increased may be suppressed, while suppressing the length of the overall length with a minimum required number of lenses as the front group negative lens group GAn.

For example, the front group negative lens group GAn of the example shown in FIG. 1 employs a two-lens configuration of lenses L1 and L2, each having a negative meniscus shape with a concave surface on the image side. Note that another configuration is also possible in which the lens L1 is replaced with a biconcave lens, as shown in an example to be described later. Configuring the front group negative lens group GAn to be composed of a negative lens with a concave surface on the image side and a negative meniscus lens with a concave surface on the image side, in order from the object side is advantageous for increasing the angle of view.

Preferably, the front group positive lens group GAp employs a three-lens configuration of a positive lens, a negative lens, and a positive lens, in order from the object side. Configuring the front group positive lens group GAp in the foregoing three lens configuration, which is so-called a triplet configuration, allows various aberrations to be corrected satisfactorily while suppressing the overall length with a minimum required number of lenses as the front group positive lens group GAp, thereby facilitating the configuration of an optical system having a small F-number.

For example, the front group positive lens group GAp of the example shown in FIG. 1 employs a three-lens configuration of a lens L3 having a positive meniscus shape with a concave surface on the object side, a lens L4 have a biconcave shape, and a lens L5 having a biconvex shape, in order from the object side. Note that a configuration in which the lens L3 is replaced with a biconvex lens and a configuration in which the lens L4 is replaced with a negative meniscus lens with a concave surface on the image side are also possible, as shown in examples to be described later.

Forming the image side surface of the most image side negative lens in the front group negative lens group GAn in a concave surface and the object side surface of the most object side positive lens in the front group positive lens group GAp in a concave surface or in a convex surface having a large absolute value of radius of curvature allows a relatively wide air space to be provide between the front group negative lens group GAn and the front group positive lens group GAp on the optical axis, which is advantageous for satisfactory correction of lateral chromatic aberration.

As in the example shown, for example, in FIG. 1, the rear group GB may employ a three-lens configuration of a positive lens, a negative lens, and a positive lens, in order from the object side. In this way, the use of a positive lens as the most object side lens in the rear group GB, that is, as the lens immediately following the aperture stop St on the image side is advantageous for downsizing because a converging effect can be given to the light beam which tends to spread after passing through the aperture stop St. Disposing a positive lens on the most image side of the entire system allows the incident angle of a principal ray of an off-axis light beam on the image plane Sim to be close to a right angle, thereby contributing to obtain a good image when the imaging lens 1 is used in combination of an image sensor, such as a CCD or the like.

When the foregoing three-lens configuration is employed for the rear group GB, it is preferable that the image side surface of the most object side positive lens in the rear group GB is formed in a convex surface and the negative lens in the rear group GB is formed in a negative meniscus lens with a convex surface on the image side. Such shapes are advantageous for suppressing the generation of various types of aberrations in a wide angle lens system.

The imaging lens 1 of the present embodiment may be configured to include an aspherical lens, and such arrangement is advantageous for increasing the angle of view, providing a small F-number, and satisfactorily correcting aberrations. In particular, it is more effective if one or any combination of the most image side lens in the front group negative lens group GAn, the most image side lens in the front group positive lens group GAp, and the most image side lens in the rear group GB is formed aspherical.

When the Abbe number of the most object side positive lens in the front group positive lens group GAp with respect to the d-line is taken as νp, the imaging lens 1 of the present embodiment is configured to satisfy a conditional expression (1) given below:

$$\nu p < 30 \qquad (1).$$

The conditional expression (1) defines a suitable range of Abbe numbers of the first positive lens on which a light beam entered into the lens system from the object side is incident after transmitting through a plurality of negative lenses. Dissatisfying the upper limit of the conditional expression (1) results in that lateral chromatic aberration, whose amount is likely to increase with increase in the angle of view, tends to be under, thereby causing a difficulty in realizing a wide angle imaging lens having satisfactory optical performance. Satisfying the conditional expression (1) allows lateral chromatic aberration to be corrected satisfactorily.

Further, when the Abbe number of a negative lens with respect to the d-line, which is the smallest of those of negative lenses included in the rear group GB with respect to the d-line, is taken as νn, the imaging lens 1 of the present embodiment preferably satisfies a conditional expression (2) given below:

$$\nu n < 23 \quad (2).$$

The conditional expression (2) defines a suitable range of Abbe numbers of a negative lens having a smallest Abbe number in the rear group GB having a positive refractive power. Dissatisfying the upper limit of the conditional expression (2) causes a difficulty in satisfactorily correcting longitudinal and lateral chromatic aberrations. Satisfying the conditional expression (2) may facilitate satisfactory correction of longitudinal and lateral chromatic aberrations.

Still further, when the focal length of the entire system is taken as f and the focal length of the front group GA is taken as fA, the imaging lens 1 of the present invention preferably satisfies a conditional expression (3) given below:

$$0.3 < f/fA < 1.2 \quad (3)$$

The conditional expression (3) relates to a refractive power distribution to the front group GA with respect to the entire system. Dissatisfying the lower limit of the conditional expression (3) causes the overall length of the lens system to be increased. Dissatisfying the upper limit of the conditional expression (3) causes a difficulty in increasing the angle of view. Satisfying the conditional expression (3) may facilitate a wide angle configuration, while suppressing the overall length of the lens system.

Further, when the focal length of the front group GA is taken as fA and the focal length of the rear group GB is taken as fB, the imaging lens 1 of the present invention preferably satisfies a conditional expression (4) given below:

$$0.1 < fA/fB < 1.2 \quad (4).$$

The conditional expression (4) relates to the ratio in refractive power between the front group GA and the rear group GB. Dissatisfying the lower limit of the conditional expression (4) causes a difficulty in increasing the angle of view. Dissatisfying the upper limit of the conditional expression (4) causes the overall length to be increased or spherical aberration to be aggravated. Satisfying the conditional expression (4) facilitates to take balance in refractive power between the front group GA and the rear group GB, and to provide a wide angle configuration while suppressing spherical aberration and overall length.

Still further, when the radii of curvature of the object side surface and the image side surface of the most object side positive lens in the front group positive lens group GAp are taken as Rp1 and Rp2 respectively, the imaging lens 1 of the present invention preferably satisfies a conditional expression (5) given below:

$$0.1 < (Rp1 - Rp2)/(Rp1 + Rp2) < 4.5 \quad (5)$$

The conditional expression (5) relates to the surface shape of the most object side positive lens in the entire system. Dissatisfying the lower limit of the conditional expression (5) causes spherical aberration to tend to be over or longitudinal chromatic aberration to tend to be over. Dissatisfying the upper limit of the conditional expression (5) causes spherical aberration to tend to be over or lateral chromatic aberration to tend to be over, which is difficult to correct. Satisfying the conditional expression (5) may facilitate satisfactory correction of spherical aberration and chromatic aberration, thereby facilitating the realization of an optical system having a small F-number.

Further, when the air space between the front group negative lens group GAn and the front group positive lens group GAp on the optical axis is taken as Dnp, and the focal length of the entire system is taken as f, the imaging lens 1 of the present invention preferably satisfies a conditional expression (6) given below:

$$0.1 < Dnp/f < 0.8 \quad (6).$$

Dissatisfying the lower limit of the conditional expression (6) causes lateral chromatic aberration to tend to be under, which is difficult to correct. Dissatisfying the upper limit of the conditional expression (6) causes a wide angle configuration to be difficult or the overall length of the lens system to be increased. Satisfying the conditional expression (6) facilitates a wide angle configuration and satisfactory correction of lateral chromatic aberration while suppressing the overall length of the lens system.

In view of the foregoing circumstances, it is more preferable that a conditional expression (1') or (1") given below is satisfied instead of the conditional expression (1), and each of conditional expressions (2') to (6') given below is satisfied instead of each of the conditional expressions (2) to (6):

$$\nu p < 25 \quad (1')$$

$$\nu p < 23 \quad (1'')$$

$$\nu n < 20 \quad (2')$$

$$0.4 < f/fA < 1.0 \quad (3')$$

$$0.2 < fA/fB < 1.0 \quad (4')$$

$$0.15 < (Rp1 - Rp2)/(Rp1 + Rp2) < 4.1 \quad (5')$$

$$0.2 < Dnp/f < 0.6 \quad (6').$$

The foregoing preferable configurations may be combined arbitrarily and are preferably employed selectively, as appropriate, according to required specifications.

Next, numerical examples of the imaging lens of the present invention will be described.

EXAMPLE 1

Figure 2:
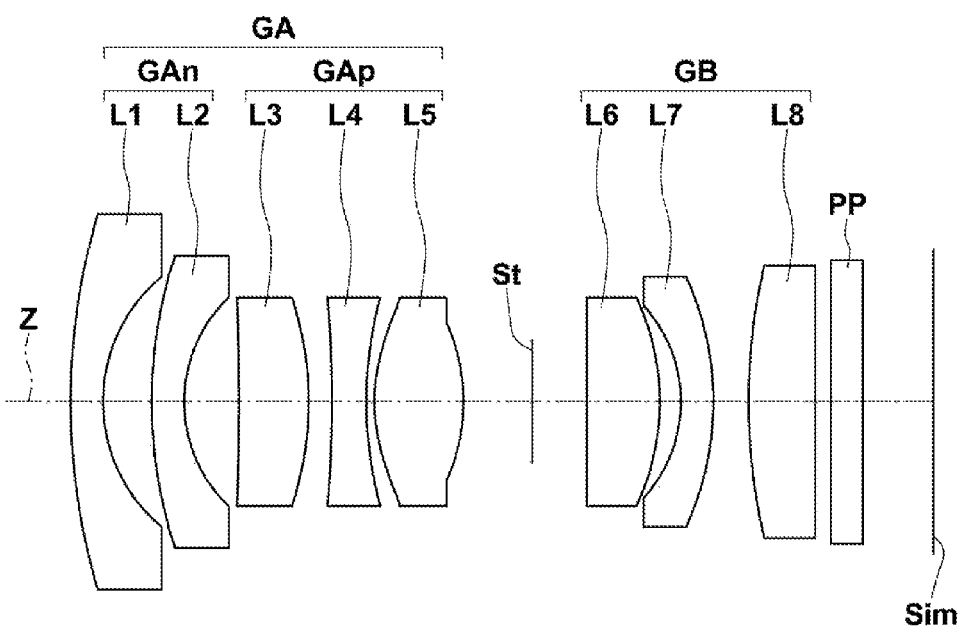
FIG. 2 is a cross-sectional view of an imaging lens of Example 1, illustrating the configuration thereof.

A cross-sectional view of the imaging lens of Example 1, illustrating the configuration thereof, is shown in FIG. 2. In FIG. 2 the left side is the object side and the right side is the image side, and FIG. 2 shows an example in which a parallel-plate like optical member PP which assumes a cover glass, various filters, and the like is disposed between the most image side lens and the image plane Sim.

The imaging lens of Example 1 takes a group configuration in which a front group GA having a positive refractive power, an aperture stop St, and a rear group GB having a positive refractive power are disposed in order from the object side. The front group GA takes a group configuration in which a front group negative lens group GAn having a negative refractive power and a front group positive lens group GAp having a positive refractive power are disposed in order from the object side.

Schematic configuration of each lens constituting each lens group of the imaging lens of Example 1 is as follows. That is, the front group negative lens group GAn is composed of a negative lens L1 and a negative lens L2, in order from the object side, the front group positive lens group GAp is composed of a positive lens L3, a negative lens L4, and a positive lens L5, in order from the object side, and the rear group GB is composed of a positive lens L6, a negative lens L7, and a positive lens L8 in order from the object side, in which all lenses are uncemented single lenses and only the lens L5 is aspherical.

As numerical data representing the detailed configuration of the imaging lens of Example 1, Table 1 shows basic lens data and Table 2 shows aspherical surface coefficients. The "f", "Bf", "FNo." and "2ω" indicated on the upper most margin of Table 1 represents the focal length of the entire system, back focus in terms of air equivalent distance, F-number, and total angle of view respectively.

The Si column in Table 1 indicates $i^{th}$ surface number in which a number i (i=1, 2, 3, - - - ) is given to each surface in a serially increasing manner toward the image side with the object side surface of the most object side constituent element being taken as the first surface. The Ri column indicates the radius of curvature of $i^{th}$ surface and the Di column indicates the surface distance on the optical axis Z between $i^{th}$ surface and $(i+1)^{th}$ surface. The bottom of the Di column indicates the surface distance between the most image side surface shown in Table 1 and the image plane Sim. The sign of the radius of curvature is positive if the surface shape is convex on the object side and negative if it is convex on the image side.

The Ndj column of Table 1 indicates the refractive index of $j^{th}$ optical element with respect to the d-line (wavelength of 587.56 nm) in which a number j (j=1, 2, 3, - - - ) is given to each constituent element in a serially increasing manner toward the image side with the most object side constituent element being taken as the first element, and the vdj column indicates the Abbe number of $j^{th}$ optical element with respect to the d-line. Note that the aperture stop St and the optical member PP are also included in the lens data, and the surface number column corresponding to the aperture stop St includes the word (St), as well as the surface number.

A mark "*" is attached to the surface number of an aspherical surface and a numerical value of paraxial radius of curvature is indicated as the radius of curvature of the aspherical surface in the basic lens data of Table 1. Table 2 shows aspherical surface coefficients of these aspherical surfaces. "E−n" (n: integer) in the values of aspherical surface coefficients in Table 2 refers to "×10$^{-n}$". The aspherical surface coefficients are the values of each of coefficients KA and Am (m=4, 6, 8, and 10) in an aspherical surface expression represented by a formula (A) given below. The "Σ" in the formula (A) refers to sum with respect to the term "m".

$$Zd = C \cdot h^2 / \{1 - KA \cdot C^2 \cdot h^2)^{1/2}\} + \Sigma Am \cdot h^m \quad (A)$$

where,

Zd: depth of aspherical surface (length of vertical line extended from a point on the aspherical surface at height h to a flat surface orthogonal to the optical axis to which the aspherical apex contacts)

h: height (distance from the optical axis)

C: paraxial curvature

KA, Am: aspherical surface coefficients (m=4, 6, 8, and 10).

The "degree" is used as the unit of angle, while "mm" is used as the unit of length in each table shown below, but other appropriate units may also be used, as optical systems can be used by proportionally enlarged or reduced. Further, each table shows values rounded to a predetermined digit.

TABLE 1 f = 3.57, Bf = 2.63, FNo. = 2.44, 2ω = 110.0

| Si | Ri | Di | Ndj | vdj |
|---|---|---|---|---|
| 1 | 15.4176 | 0.80 | 1.75500 | 52.32 |
| 2 | 3.8402 | 1.20 | | |
| 3 | 10.9850 | 0.80 | 1.80400 | 46.58 |
| 4 | 3.3940 | 1.35 | | |
| 5 | −64.4000 | 1.72 | 1.95906 | 17.47 |
| 6 | −7.6934 | 0.57 | | |
| 7 | −29.4960 | 0.85 | 1.92286 | 18.90 |
| 8 | 9.2785 | 0.20 | | |
| *9 | 4.1429 | 2.20 | 1.58313 | 59.46 |
| *10 | −4.4842 | 1.69 | | |
| 11 (St) | ∞ | 1.35 | | |
| 12 | ∞ | 1.80 | 1.75500 | 52.32 |
| 13 | −5.6781 | 0.52 | | |
| 14 | −3.3407 | 0.80 | 1.92286 | 18.90 |
| 15 | −7.0462 | 0.87 | | |
| 16 | 14.0568 | 1.65 | 1.80610 | 40.92 |
| 17 | ∞ | 0.37 | | |
| 18 | ∞ | 0.80 | 1.51633 | 64.14 |
| 19 | ∞ | 1.73 | | |

TABLE 2

| | Si | |
|---|---|---|
| | 9 | 10 |
| KA | −1.4141323E+00 | −7.8353666E−01 |
| A4 | 4.8932287E−04 | −1.9034828E−03 |
| A6 | −3.6903498E−04 | −5.9819694E−05 |
| A8 | 6.1372202E−05 | 1.2315281E−05 |
| A10 | −6.6272567E−06 | −2.6278729E−06 |

A to D of FIG. 11 respectively show aberration diagrams of spherical aberration, astigmatism, distortion, and lateral chromatic aberration of the imaging lens of Example 1 when the object distance is infinity. The "FNo." in the spherical aberration diagram refers to F-number and "ω" in the other aberration diagrams refers to half angle of view. Each aberration diagram shows aberration with the d-line (wavelength 587.56 nm) as the reference wavelength. But, the spherical aberration diagram also shows aberrations with respect to the C-line (wavelength 656.27 nm) and the F-line (wavelength 486.13 nm), and the lateral chromatic aberration diagram shows aberrations with respect to the C-line and the F-line. The astigmatism diagram shows aberrations in the sagittal direction and the tangential direction by the solid line and the broken line respectively, and the symbols "(S)" and "(T)" are attached to the explanatory notes of the line types respectively.

The illustration method, symbols in the respective data and their meanings, and description method explained in foregoing Example 1 are applicable to the following examples unless otherwise specifically described and a duplicated explanation will be omitted below.

EXAMPLE 2

A cross-sectional view of the imaging lens of Example 2, illustrating the configuration thereof, is shown in FIG. 3. The group configuration and the schematic configuration of the imaging lens of Example 2 are identical to those of Example 1 described above. Basic lens data and aspherical surface coefficients of the imaging lens of Example 2 are shown in Tables 3 and 4 respectively. Each aberration diagram of the imaging lens of Example 2 is shown in A to D of FIG. 12.

TABLE 3

| f = 3.51, Bf = 2.59, FNo. = 2.44, 2ω = 115.6 | | | | |
|---|---|---|---|---|
| Si | Ri | Di | Ndj | νdj |
| 1 | 18.7657 | 0.80 | 1.69680 | 55.53 |
| 2 | 3.8300 | 1.20 | | |
| 3 | 10.8644 | 0.80 | 1.75500 | 52.32 |
| 4 | 3.3704 | 1.36 | | |
| 5 | −49.6642 | 1.92 | 1.92286 | 18.90 |
| 6 | −7.7781 | 0.77 | | |
| 7 | −68.5705 | 0.80 | 1.92286 | 18.90 |
| 8 | 8.6612 | 0.20 | | |
| *9 | 4.1990 | 2.20 | 1.58913 | 61.15 |
| *10 | −4.3806 | 1.47 | | |
| 11 (St) | ∞ | 1.94 | | |
| 12 | −48.5595 | 1.73 | 1.83400 | 37.16 |
| 13 | −6.0404 | 0.50 | | |
| 14 | −3.3719 | 0.80 | 1.92286 | 18.90 |
| 15 | −7.9233 | 0.11 | | |
| 16 | 19.1003 | 1.80 | 1.74100 | 52.64 |
| 17 | −20.8674 | 0.50 | | |
| 18 | ∞ | 0.80 | 1.51633 | 64.14 |
| 19 | ∞ | 1.56 | | |

TABLE 4

| Si | 9 | 10 |
|---|---|---|
| KA | −1.3039370E+00 | −9.8426856E−01 |
| A4 | 4.9138049E−04 | −1.9279385E−03 |
| A6 | −3.5241245E−04 | −4.0366994E−05 |
| A8 | 6.2619988E−05 | 9.0237765E−06 |
| A10 | −7.1481101E−06 | −2.5169510E−06 |

EXAMPLE 3

A cross-sectional view of the imaging lens of Example 3, illustrating the configuration thereof, is shown in FIG. 4. The group configuration and the schematic configuration of the imaging lens of Example 3 are identical to those of Example 1 described above, other than that only the lens L2 is aspherical. Basic lens data and aspherical surface coefficients of the imaging lens of Example 3 are shown in Tables 5 and 6 respectively. Each aberration diagram of the imaging lens of Example 3 is shown in A to D of FIG. 13.

TABLE 5

| f = 3.50, Bf = 4.00, FNo. = 2.44, 2ω = 116.6 | | | | |
|---|---|---|---|---|
| Si | Ri | Di | Ndj | νdj |
| 1 | 9.5180 | 0.80 | 1.77250 | 49.60 |
| 2 | 3.1990 | 1.20 | | |
| *3 | 3.5051 | 0.80 | 1.80610 | 40.88 |
| *4 | 2.3364 | 1.80 | | |
| 5 | −28.7076 | 1.76 | 1.95906 | 17.47 |
| 6 | −10.8755 | 0.10 | | |
| 7 | 5.6180 | 0.80 | 1.95906 | 17.47 |
| 8 | 3.7971 | 0.90 | | |
| 9 | 6.1128 | 2.20 | 1.61800 | 63.33 |
| 10 | −4.8719 | 1.51 | | |
| 11(St) | ∞ | 1.10 | | |
| 12 | −38.9068 | 1.30 | 1.69680 | 55.53 |
| 13 | −5.8158 | 0.71 | | |
| 14 | −3.4000 | 0.80 | 1.95906 | 17.47 |
| 15 | −6.7284 | 0.10 | | |
| 16 | 24.5380 | 1.20 | 1.77250 | 49.60 |
| 17 | −11.7677 | 0.50 | | |
| 18 | ∞ | 0.80 | 1.51633 | 64.14 |
| 19 | ∞ | 2.98 | | |

TABLE 6

| Si | 3 | 4 |
|---|---|---|
| KA | 1.6587634E−02 | −3.4470487E−01 |
| A4 | 2.3342799E−03 | 1.0344955E−02 |
| A6 | −3.4412273E−04 | −6.5960619E−04 |
| A8 | 1.0593991E−05 | 4.0737099E−06 |
| A10 | −3.9173272E−07 | −2.6196174E−06 |

EXAMPLE 4

A cross-sectional view of the imaging lens of Example 4, illustrating the configuration thereof, is shown in FIG. 5. The group configuration and the schematic configuration of the imaging lens of Example 4 are identical to those of Example 1 described above, other than that only the lens L2 is aspherical. Basic lens data and aspherical surface coefficients of the imaging lens of Example 4 are shown in Tables 7 and 8 respectively. Each aberration diagram of the imaging lens of Example 4 is shown in FIG. A to D of FIG. 14.

TABLE 7

| f = 3.51, Bf = 4.19, FNo. = 2.44, 2ω = 115.0 | | | | |
|---|---|---|---|---|
| Si | Ri | Di | Ndj | νdj |
| 1 | 9.2922 | 1.20 | 1.78800 | 47.37 |
| 2 | 3.3941 | 1.05 | | |
| *3 | 3.3009 | 0.80 | 1.77030 | 47.40 |
| *4 | 2.1030 | 1.93 | | |
| 5 | −29.1194 | 1.86 | 1.92286 | 18.90 |

TABLE 7-continued f = 3.51, Bf = 4.19, FNo. = 2.44, 2ω = 115.0

| Si | Ri | Di | Ndj | vdj |
|---|---|---|---|---|
| 6 | −10.4715 | 0.16 | | |
| 7 | 5.9243 | 0.80 | 1.92286 | 18.90 |
| 8 | 3.8686 | 0.85 | | |
| 9 | 6.3288 | 2.20 | 1.62041 | 60.29 |
| 10 | −4.8444 | 1.65 | | |
| 11(St) | ∞ | 0.70 | | |
| 12 | −53.1201 | 1.30 | 1.69100 | 54.82 |
| 13 | −4.8861 | 0.50 | | |
| 14 | −3.4000 | 0.80 | 1.95906 | 17.47 |
| 15 | −6.1346 | 0.10 | | |
| 16 | 47.5527 | 1.20 | 1.72916 | 54.68 |
| 17 | −18.1777 | 0.50 | | |

TABLE 7-continued f = 3.51, Bf = 4.19, FNo. = 2.44, 2ω = 115.0

| Si | Ri | Di | Ndj | vdj |
|---|---|---|---|---|
| 18 | ∞ | 0.80 | 1.51633 | 64.14 |
| 19 | ∞ | 3.16 | | |

TABLE 8

| Si | 3 | 4 |
|---|---|---|
| KA | 1.3412733E−01 | −7.5612206E−01 |
| A4 | 2.4299088E−03 | 1.9345987E−02 |
| A6 | −5.8217083E−04 | −1.5833305E−03 |
| A8 | 5.8152821E−06 | −3.4080973E−05 |
| A10 | 6.2822673E−07 | 7.5602547E−06 |

EXAMPLE 5

A cross-sectional view of the imaging lens of Example 5, illustrating the configuration thereof, is shown in FIG. 6. The group configuration and the schematic configuration of the imaging lens of Example 5 are identical to those of Example 1 described above, other than that the lenses L2 and L5 are aspherical. Basic lens data and aspherical surface coefficients of the imaging lens of Example 5 are shown in Tables 9 and 10 respectively. Each aberration diagram of the imaging lens of Example 5 is shown in A to D of FIG. 15.

TABLE 9 f = 3.53, Bf = 2.83, FNo. = 2.44, 2ω = 114.2

| Si | Ri | Di | Ndj | vdj |
|---|---|---|---|---|
| 1 | 13.3997 | 0.80 | 1.77250 | 49.60 |
| 2 | 3.3878 | 0.51 | | |
| *3 | 3.2477 | 0.80 | 1.80610 | 40.88 |
| *4 | 1.9742 | 1.95 | | |
| 5 | −88.8367 | 1.59 | 1.95906 | 17.47 |
| 6 | −9.8507 | 0.10 | | |
| 7 | 11.9862 | 0.80 | 1.95906 | 17.47 |

TABLE 9-continued f = 3.53, Bf = 2.83, FNo. = 2.44, 2ω = 114.2

| Si | Ri | Di | Ndj | vdj |
|---|---|---|---|---|
| 8 | 5.1965 | 0.26 | | |
| *9 | 4.1656 | 2.20 | 1.55880 | 62.55 |
| *10 | −4.0268 | 1.14 | | |
| 11(St) | ∞ | 1.78 | | |
| 12 | 23.0583 | 1.40 | 1.69680 | 55.53 |
| 13 | −7.8003 | 0.65 | | |
| 14 | −3.4000 | 0.85 | 1.95906 | 17.47 |
| 15 | −7.1574 | 0.13 | | |
| 16 | 20.2184 | 1.20 | 1.77250 | 49.60 |
| 17 | −20.2184 | 0.50 | | |
| 18 | ∞ | 0.80 | 1.51633 | 64.14 |
| 19 | ∞ | 1.80 | | |

TABLE 10

| Si | 3 | 4 | 9 | 10 |
|---|---|---|---|---|
| KA | 1.2516183E−01 | −4.0919307E−01 | −4.1052753E−01 | 9.2861065E−02 |
| A4 | 1.8150444E−03 | 1.5888165E−02 | 3.0392836E−04 | −7.3008070E−04 |
| A6 | −3.8174030E−04 | −6.1795846E−04 | −1.2207436E−04 | −2.8642097E−04 |
| A8 | 9.4414249E−06 | −5.9107947E−05 | 1.0785639E−06 | 7.3438694E−05 |
| A10 | 3.2538774E−07 | 1.3181776E−05 | 2.3576003E−06 | −6.7534421E−06 |

EXAMPLE 6

A cross-sectional view of the imaging lens of Example 6, illustrating the configuration thereof, is shown in FIG. 7. The group configuration and the schematic configuration of the imaging lens of Example 6 are identical to those of Example 1 described above, other than that the lenses L5 and L8 are aspherical. Basic lens data and aspherical surface coefficients of the imaging lens of Example 6 are shown in Tables 11 and 12 respectively. Each aberration diagram of the imaging lens of Example 6 is shown in A to D of FIG. 16.

TABLE 11 f = 3.53, Bf = 2.56, FNo. = 2.44, 2ω = 113.6

| Si | Ri | Di | Ndj | vdj |
|---|---|---|---|---|
| 1 | 14.8116 | 1.20 | 1.65160 | 58.55 |
| 2 | 3.6107 | 1.20 | | |
| 3 | 8.9516 | 1.09 | 1.81600 | 46.62 |
| 4 | 3.1995 | 1.60 | | |
| 5 | −11.4859 | 1.31 | 1.92286 | 18.90 |
| 6 | −7.8453 | 0.50 | | |
| 7 | 9.6912 | 1.00 | 1.92286 | 18.90 |
| 8 | 5.6069 | 0.20 | | |
| *9 | 4.4446 | 2.20 | 1.61800 | 63.33 |
| *10 | −4.8024 | 2.07 | | |
| 11(St) | ∞ | 1.57 | | |
| 12 | 35.6590 | 1.30 | 1.65160 | 58.55 |
| 13 | −6.4448 | 0.51 | | |
| 14 | −3.4901 | 0.89 | 1.92286 | 18.90 |
| 15 | −7.5187 | 0.35 | | |
| *16 | 8.4389 | 1.20 | 1.77250 | 49.60 |
| *17 | 26.3446 | 0.50 | | |
| 18 | ∞ | 0.80 | 1.51633 | 64.14 |
| 19 | ∞ | 1.53 | | |

TABLE 12

| Si | 9 | 10 | 16 | 17 |
|---|---|---|---|---|
| KA | −6.8190007E−01 | −1.0259789E−01 | 9.0177192E−01 | 2.5628238E+01 |
| A4 | 2.0245006E−04 | −1.1440198E−03 | −1.1399164E−05 | 1.5338862E−04 |
| A6 | −2.5975151E−04 | −1.8507498E−05 | 8.9973033E−06 | −1.2230657E−05 |
| A8 | 5.4126102E−05 | 5.8756545E−06 | −4.6020249E−07 | −2.9515004E−07 |
| A10 | −6.0807833E−06 | −2.2579352E−06 | −6.7417324E−08 | −8.7710904E−08 |

EXAMPLE 7

A cross-sectional view of an imaging lens of Example 7, illustrating the configuration thereof, is shown in FIG. 8. The group configuration and the schematic configuration of the imaging lens of Example 7 are identical to those of Example 1 described above. Basic lens data and aspherical surface coefficients of the imaging lens of Example 7 are shown in Tables 13 and 14 respectively. Each aberration diagram of the imaging lens of Example 7 is shown in A to D of FIG. 17.

TABLE 13 f = 4.64, Bf = 5.23, FNo. = 2.44, 2ω = 143.6

| Si | Ri | Di | Ndj | νdj |
|---|---|---|---|---|
| 1 | 57.6399 | 0.80 | 1.60300 | 65.44 |
| 2 | 3.9394 | 1.20 | | |
| 3 | 6.0037 | 1.03 | 1.65160 | 58.55 |
| 4 | 2.9243 | 1.78 | | |
| 5 | 33.2270 | 1.57 | 1.84666 | 23.88 |
| 6 | −20.0372 | 0.50 | | |
| 7 | −21.5786 | 0.80 | 1.62588 | 35.70 |
| 8 | 6.9749 | 0.20 | | |
| *9 | 5.2072 | 2.20 | 1.51633 | 64.06 |
| *10 | −4.4242 | 0.88 | | |
| 11(St) | ∞ | 1.24 | | |
| 12 | 13.5251 | 1.30 | 1.60300 | 65.44 |
| 13 | −5.7233 | 0.86 | | |
| 14 | −4.0282 | 0.80 | 1.92286 | 18.90 |
| 15 | −7.9493 | 0.10 | | |
| 16 | −106.4045 | 1.20 | 1.48749 | 70.23 |
| 17 | −9.4151 | 0.50 | | |
| 18 | ∞ | 0.80 | 1.51633 | 64.14 |
| 19 | ∞ | 4.20 | | |

TABLE 14

| Si | 9 | 10 |
|---|---|---|
| KA | −2.7460233E+00 | −1.6760470E−01 |
| A4 | 2.3351543E−04 | −2.0611611E−03 |
| A6 | −3.6249878E−04 | −1.5642906E−04 |
| A8 | 5.1390615E−05 | 1.2865408E−05 |
| A10 | −6.3685087E−06 | −2.6310974E−06 |

EXAMPLE 8

A cross-sectional view of an imaging lens of Example 8, illustrating the configuration thereof, is shown in FIG. 9. The group configuration and the schematic configuration of the imaging lens of Example 8 are identical to those of Example 1 described above, other than that the lenses L2 and L5 are aspherical. Basic lens data and aspherical surface coefficients of the imaging lens of Example 8 are shown in Tables 15 and 16 respectively. Each aberration diagram of the imaging lens of Example 8 is shown in A to D of FIG. 18.

TABLE 15 f = 5.99, Bf = 5.41, FNo. = 2.45, 2ω = 143.8

| Si | Ri | Di | Ndj | νdj |
|---|---|---|---|---|
| 1 | 45.8821 | 1.12 | 1.77250 | 49.60 |
| 2 | 3.9702 | 1.23 | | |
| *3 | 4.0607 | 0.88 | 1.80610 | 40.88 |
| *4 | 2.3758 | 1.43 | | |
| 5 | −14.1163 | 1.51 | 1.95906 | 17.47 |
| 6 | −9.8980 | 0.10 | | |
| 7 | 10.0065 | 1.00 | 1.95906 | 17.47 |
| 8 | 8.5444 | 0.20 | | |
| *9 | 6.0994 | 2.20 | 1.55880 | 62.55 |
| *10 | −5.2043 | 1.50 | | |
| 11(St) | ∞ | 0.60 | | |
| 12 | 37.2624 | 1.30 | 1.69680 | 55.53 |
| 13 | −5.8358 | 0.53 | | |
| 14 | −3.2296 | 0.80 | 1.95906 | 17.47 |
| 15 | −6.3964 | 0.10 | | |
| 16 | −17.7950 | 1.20 | 1.77250 | 49.60 |
| 17 | −6.3245 | 0.50 | | |
| 18 | ∞ | 0.80 | 1.51633 | 64.14 |
| 19 | ∞ | 4.38 | | |

TABLE 16

| Si | 3 | 4 | 9 | 10 |
|---|---|---|---|---|
| KA | −3.8338630E−01 | −5.8705183E−01 | −1.0491526E+00 | 1.4712215E+00 |
| A4 | 1.6655242E−03 | 1.2733703E−02 | 8.7153280E−04 | −4.3202551E−04 |
| A6 | −3.3048874E−04 | −3.7289195E−04 | −9.9864423E−05 | 1.3306296E−04 |
| A8 | −8.5398174E−06 | −1.1233906E−04 | 9.4229871E−06 | −2.6148448E−05 |
| A10 | 1.3957326E−06 | 1.7870942E−05 | −9.5729307E−07 | 2.9104873E−06 |

EXAMPLE 9

A cross-sectional view of an imaging lens of Example 9, illustrating the configuration thereof, is shown in FIG. 10. The group configuration and the schematic configuration of the imaging lens of Example 9 are identical to those of Example 1 described above, other than that the lenses L2 and L8 are aspherical, and the lenses L4 and L5 are cemented. Basic lens data and aspherical surface coefficients of the imaging lens of Example 9 are shown in Tables 17 and 18 respectively. Each aberration diagram of the imaging lens of Example 9 is shown in A to D of FIG. 19.

TABLE 17 f = 5.43, Bf = 3.26, FNo. = 2.44, 2ω = 145.4

| Si | Ri | Di | Ndj | vdj |
|---|---|---|---|---|
| 1 | −88.9864 | 0.88 | 1.48749 | 70.23 |
| 2 | 3.2202 | 1.17 | | |
| *3 | 3.2873 | 0.80 | 1.51633 | 64.06 |
| *4 | 2.0808 | 1.92 | | |
| 5 | −21.1220 | 1.45 | 1.92286 | 18.90 |
| 6 | −14.2772 | 0.10 | | |
| 7 | 7.8057 | 0.87 | 1.84666 | 23.88 |
| 8 | 4.5317 | 2.20 | 1.69680 | 55.53 |
| 9 | −6.2366 | 2.08 | | |
| 10(St) | ∞ | 0.78 | | |
| 11 | 67.6587 | 1.30 | 1.65160 | 58.55 |
| 12 | −5.1234 | 0.61 | | |
| 13 | −3.5647 | 0.82 | 1.92286 | 18.90 |
| 14 | −8.0187 | 0.14 | | |
| *15 | 15.5898 | 1.70 | 1.83481 | 42.73 |
| *16 | −19.6489 | 0.50 | | |
| 17 | ∞ | 0.80 | 1.51633 | 64.14 |
| 18 | ∞ | 2.23 | | |

TABLE 18

| Si | 3 | 4 | 15 | 16 |
|---|---|---|---|---|
| KA | −1.6879376E−01 | −7.2205608E−01 | −2.2093722E+01 | 2.0402491E+01 |
| A4 | 3.6077378E−03 | 1.8044671E−02 | −3.3747142E−04 | −6.4490026E−04 |
| A6 | −4.8088745E−04 | −1.1834005E−03 | 3.9613616E−05 | 1.2892785E−05 |
| A8 | 1.2169058E−05 | −9.3714650E−06 | 3.3324231E−06 | 4.6272451E−06 |
| A10 | −1.9942849E−07 | −1.6238215E−06 | 3.8614551E−08 | 2.0617074E−07 |

Values of the foregoing imaging lenses of Examples 1 to 9 corresponding to the conditional expressions (1) to (6) are shown in Table 19. Note that the values shown in Table 19 are those with respect to the d-line.

TABLE 19

| | (1) vp | (2) vn | (3) f/fA | (4) fA/fB | (5) Rp1 −Rp2 / Rp1 + Rp2 | (6) Dnp/f |
|---|---|---|---|---|---|---|
| Example 1 | 17.47 | 18.90 | 0.76 | 0.28 | 0.79 | 0.38 |
| Example 2 | 18.90 | 18.90 | 0.85 | 0.22 | 0.73 | 0.39 |
| Example 3 | 17.47 | 17.47 | 0.68 | 0.41 | 0.45 | 0.51 |
| Example 4 | 18.90 | 17.47 | 0.66 | 0.39 | 0.47 | 0.55 |
| Example 5 | 17.47 | 17.47 | 0.76 | 0.30 | 0.80 | 0.55 |
| Example 6 | 18.90 | 18.90 | 0.78 | 0.26 | 0.19 | 0.45 |
| Example 7 | 23.88 | 18.90 | 0.44 | 0.97 | 4.04 | 0.38 |
| Example 8 | 17.47 | 17.47 | 0.87 | 0.62 | 0.18 | 0.24 |
| Example 9 | 18.90 | 18.90 | 0.89 | 0.60 | 0.19 | 0.35 |

As is known from the foregoing data, each of the imaging lenses of Examples 1 to 9 consists of eight lenses, being configured small with a short overall length, and having a wide angle in the range of 100° to 150° in total angle of view, a small F-number of less than or equal to 2.5, and high optical performance with well corrected aberrations.

The imaging lens according to the present embodiment can be suitably used in image devices, such as digital cameras, broadcasting cameras, surveillance cameras, vehicle cameras, and the like, and as an interchangeable lens for various types of cameras. Next, an imaging apparatus according to an embodiment of the present invention will be described with reference to FIG. 20. As an example of an imaging apparatus according to an embodiment of the present invention, a schematic configuration diagram of an imaging apparatus 10 that uses the imaging lens 1 according to an embodiment of the present invention is shown in FIG. 20.

The imaging apparatus 10 shown in FIG. 20 includes the imaging lens 1, a filter 4 disposed on the image side of the imaging lens 1, an image sensor 5 that captures a subject image formed by the imaging lens 1, and a signal processing unit 6. Note that the imaging lens 1 is illustrated conceptually in FIG. 20.

The image sensor 5 captures a subject image formed by the imaging lens 1 and converts the image to an electrical signal and disposed such that the imaging surface thereof corresponds to the image plane of the imaging lens 1. For example, a charge coupled device (CCD), a complementary metal oxide semiconductor (CMOS), or the like may be used as the image sensor 5. The output signal from the image sensor 5 is arithmetically processed by the signal processing unit 6.

So far, the present invention has been described by way of embodiments and examples, but the present invention is not limited to the foregoing embodiments and examples, and various modifications may be made. For example, values of radius of curvature, surface distance, refractive index, Abbe number, and aspherical surface coefficient of each lens are not limited to those shown in each numerical example described above and may take other values.

What is claimed is:

1. An imaging lens, consisting of a front group having a positive refractive power, a stop, and a rear group having a positive refractive power, in order from the object side, wherein:
   the front group is composed of a front group negative lens group composed of two negative lenses and a front group positive lens group having a positive refractive power, in order from the object side;
   the front group positive lens group is composed of a positive lens, a negative lens, and a positive lens, in order from the object side;
   the rear group is composed of a positive lens, a negative lens, and a positive lens, in order from the object side; and
   when the Abbe number of the most object side positive lens in the front group positive lens group with respect to the d-line is taken as vp, the imaging lens satisfies a conditional expression (1) given below:

$$vp<30 \qquad (1).$$

2. An imaging lens, consisting of a front group having a positive refractive power, a stop, and a rear group having a positive refractive power, in order from the object side, wherein:
   the front group is composed of a front group negative lens group constituted by two or more negative lenses and a front group positive lens group constituted by a plurality of lenses with a positive lens being disposed on the most object side to have a positive refractive power, in order from the object side;

the rear group includes at least one negative lens; and when the Abbe number of the most object side positive lens in the front group positive lens group with respect to the d-line is taken as νp, and the Abbe number of a negative lens with respect to the d-line, which is the smallest of those of negative lenses included in the rear group with respect to the d-line, is taken as νn, the imaging lens satisfies conditional expressions (1) and (2) given below:

$$\nu p < 30 \quad (1)$$

$$\nu n < 23 \quad (2).$$

3. The imaging lens of claim 1, wherein, when the focal length of the entire system is taken as f and the focal length of the front group is taken as fA, the imaging lens satisfies a conditional expression (3) given below:

$$0.3 < f/fA < 1.2 \quad (3).$$

4. The imaging lens of claim 1, wherein, when the focal length of the front group is taken as fA and the focal length of the rear group is taken as fB, the imaging lens satisfies a conditional expression (4) given below:

$$0.1 < fA/fB < 1.2 \quad (4).$$

5. The imaging lens of claim 1, wherein, when the radii of curvature of the object side surface and the image side surface of the most object side positive lens in the front group positive lens group are taken as Rp1 and Rp2 respectively, the imaging lens satisfies a conditional expression (5) given below:

$$0.1 < (Rp1-Rp2)/(Rp1+Rp2) < 4.5 \quad (5).$$

6. The imaging lens of claim 1, wherein, when the air space between the front group negative lens group and the front group positive lens group on the optical axis is taken as Dnp, and the focal length of the entire system is taken as f, the imaging lens satisfies a conditional expression (6) given below:

$$0.1 < Dnp/f < 0.8 \quad (6).$$

7. The imaging lens of claim 2, wherein the front group positive lens group is composed of a positive lens, a negative lens, and a positive lens, in order from the object side.

8. The imaging lens of claim 2, wherein:

the front group negative lens group is composed of two negative lenses;

the front group positive lens group is composed of a positive lens, a negative lens, and a positive lens, in order from the object side; and the rear group is composed of a positive lens, a negative lens, and a positive lens, in order from the object side.

9. The imaging lens of claim 1, wherein at least one of the most image side lens in the front group negative lens group, the most image side lens in the front group positive lens group, and the most image side lens in the rear group is an aspherical lens.

10. The imaging lens of claim 1, wherein the imaging lens satisfies a conditional expression (1') given below:

$$\nu p < 25 \quad (1').$$

11. The imaging lens of claim 1, wherein the imaging lens satisfies a conditional expression (1") given below:

$$\nu p < 23 \quad (1").$$

12. The imaging lens of claim 2, wherein the imaging lens satisfies a conditional expression (2') given below:

$$\nu n < 20 \quad (2').$$

13. The imaging lens of claim 3, wherein the imaging lens satisfies a conditional expression (3') given below:

$$0.4 < f/fA < 1.0 \quad (3').$$

14. The imaging lens of claim 4, wherein the imaging lens satisfies a conditional expression (4') given below:

$$0.2 < fA/fB < 1.0 \quad (4').$$

15. The imaging lens of claim 5, wherein the imaging lens satisfies a conditional expression (5') given below:

$$0.15 < (Rp1-Rp2)/(Rp1+Rp2) < 4.1 \quad (5').$$

16. The imaging lens of claim 6, wherein the imaging lens satisfies a conditional expression (6') given below:

$$0.2 < Dnp/f < 0.6 \quad (6').$$

17. An imaging apparatus equipped with the imaging lens of claim 1.

18. An imaging apparatus equipped with the imaging lens of claim 2.

* * * * *